(12) United States Patent
Sakalanaga et al.

(10) Patent No.: US 10,389,746 B2
(45) Date of Patent: Aug. 20, 2019

(54) MULTI-TENANT ENVIRONMENT USING PRE-READIED TRUST BOUNDARY COMPONENTS

(71) Applicant: Microsoft Technology Licensing, LLC, Redmond, WA (US)

(72) Inventors: Sarvesh Sakalanaga, Bellevue, WA (US); Abdelsalam Heddaya, Bellevue, WA (US); Mitchel Chinedu Arene, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 129 days.

(21) Appl. No.: 15/277,654

(22) Filed: Sep. 27, 2016

(65) Prior Publication Data
US 2017/0093903 A1    Mar. 30, 2017

Related U.S. Application Data

(60) Provisional application No. 62/233,966, filed on Sep. 28, 2015.

(51) Int. Cl.
*G06F 11/00*     (2006.01)
*H04L 29/06*     (2006.01)
(Continued)

(52) U.S. Cl.
CPC ........ *H04L 63/1433* (2013.01); *G06F 9/5027* (2013.01); *G06F 21/53* (2013.01); *G06F 21/57* (2013.01); *G06F 21/74* (2013.01)

(58) Field of Classification Search
CPC ... H04L 63/1433; G06F 9/5027; G06F 21/74; G06F 21/57; G06F 21/53
(Continued)

(56) References Cited

U.S. PATENT DOCUMENTS 7,689,996 B2   3/2010   Dillenberger et al.
8,364,802 B1   1/2013   Keagy et al.
(Continued)

OTHER PUBLICATIONS

"Second Written Opinion Issued in PCT Application No. PCT/US2016/054184", dated Mar. 24, 2017, 6 Pages.
(Continued)

*Primary Examiner* — Mohammad W Reza
(74) *Attorney, Agent, or Firm* — Workman Nydegger (57) ABSTRACT

The low latency use of a multi-tenancy environment. To protect against hostility between tenants within different trust domains, tenant(s) of a common trust domain are run within a trust boundary component. Thus, there is security to protect against potential hostility between tenants of different trust domains. In order to quickly start up trust boundary components, there are multiple pre-readied (e.g., initialized, pre-booted, and/or snapshotted) trust boundary components that may be started up quickly when a new trust boundary is to be established. Processes within the trust boundary component may additionally be run within a resource container that facilitates allocation of resources amongst the various processes. Because trust boundary components may be started up quickly, the multi-tenancy environment may have security (as provided by the trust boundary components) while still being lower latency (due to the fast availability of pre-readied trust boundaries).

20 Claims, 5 Drawing Sheets

(51) Int. Cl.
*G06F 9/50* (2006.01)
*G06F 21/53* (2013.01)
*G06F 21/57* (2013.01)
*G06F 21/74* (2013.01)

(58) Field of Classification Search
USPC .......................................................... 726/25
See application file for complete search history.

(56) References Cited

U.S. PATENT DOCUMENTS

| | | | |
|---|---|---|---|
| 8,473,627 B2 | 6/2013 | Astete et al. | |
| 8,572,138 B2 | 10/2013 | Sunder et al. | |
| 9,021,477 B2 | 4/2015 | Choudhury et al. | |
| 9,069,983 B1 | 6/2015 | Nijjar | |
| 9,197,644 B1* | 11/2015 | Sherman | H04L 63/0807 |
| 9,509,571 B1* | 11/2016 | Liu | H04L 41/50 |
| 2005/0198303 A1 | 9/2005 | Knauerhase et al. | |
| 2006/0184936 A1 | 8/2006 | Abels et al. | |
| 2009/0327471 A1* | 12/2009 | Astete | G06F 9/45533 |
| | | | 709/223 |
| 2011/0302415 A1 | 12/2011 | Ahmad et al. | |
| 2012/0017210 A1 | 1/2012 | Huggins et al. | |
| 2012/0233123 A1 | 9/2012 | Shisheng et al. | |
| 2012/0323853 A1 | 12/2012 | Fries et al. | |
| 2013/0061293 A1 | 3/2013 | Mao | |
| 2014/0090037 A1* | 3/2014 | Singh | H04L 63/0815 |
| | | | 726/7 |
| 2014/0109087 A1 | 4/2014 | Jujare et al. | |
| 2014/0130142 A1* | 5/2014 | Plewnia | G06F 21/335 |
| | | | 726/5 |
| 2014/0331309 A1* | 11/2014 | Spiers | H04L 63/0218 |
| | | | 726/12 |
| 2015/0052520 A1 | 2/2015 | Crowell et al. | |
| 2015/0163088 A1 | 6/2015 | Anschutz | |
| 2015/0177997 A1 | 6/2015 | Warszawski et al. | |

OTHER PUBLICATIONS

International Search Report and Written Opinion for PCT Application No. PCT/US2016/054184, dated Nov. 30, 2016.

Arndt, et al., "Dynamic Load Distribution with the WINNER System", In Proceedings of Workshop Anwendungsbezogene Lastverteilung, Mar. 1998, pp. 1-12.

Buyya, et al., "Modeling and Simulation of Scalable Cloud Computing Environments and the CloudSim Toolkit: Challenges and Opportunities", In Proceedings of International Conference on High Performance Computing & Simulation, Jun. 21, 2009, pp. 1-11.

Sullivan, Dan, "Rules for deploying Virtual Machine Images in the Cloud", Published on: Mar. 2012 Available at: http://searchcloudcomputing.techtarget.com/tip/Rules-for-deploying-virtual-machine-images-in-the-cloud.

"Creating Snapshot of just the VM, not all Attached Storage", Retrieved on: Oct. 15, 2015 Available at: http://communities.vmware.com/message/2048399.

"International Preliminary Report on Patentability Issued in PCT Application No. PCT/US2016/054184", dated Jul. 17, 2017, 7 Pages.

"Office Action Issued in European Patent Application No. 16779290.2", dated Sep. 6, 2018, 8 Pages.

* cited by examiner

MULTI-TENANT ENVIRONMENT USING PRE-READIED TRUST BOUNDARY COMPONENTS

CROSS-REFERENCE TO RELATED APPLICATION

This application claims the benefit of U.S. Provisional Patent Application Ser. No. 62/233,966 filed Sep. 28, 2015, which provisional patent application is incorporated herein by reference in its entirety.

BACKGROUND

Computing systems and associated networks have revolutionized the way human beings work, play, and communicate. Nearly every aspect of our lives is affected in some way by computing systems. Of course, to ensure the proper operation of computing resources, both hardware and software are important. More and more often, hardware and even software resources are provided in a multi-tenancy environment, such as a public or even private cloud computing environment. In a multi-tenancy environment, resources are shared between different users using containers.

In a multi-tenancy environment, the various tenants sometimes mutually trust each other. This might be the case in a private cloud computing environment in which the users are all members of the same organization, and there are restrictions imposed as to what actions may be performed. In other words, there is little risk that one process will be hostile towards another, or perform an action that will cause risk to another process. In that case, the processes may be operated within a resource container that does not have to provide a trust boundary. An example of such a container is a job object in WINDOWS® or a cgroup in LINUX®. Such containers have the advantage in allowing different processes to share resources, while being low-latency in that they can be started up quickly. Such multi-tenancy environments are often used to perform large map-reduce operations (such as big data queries) where the number of containers might be quite large due to high parallelism.

In other multi-tenancy environments, the various tenants could potentially be hostile towards each other. Such might be the case in, for instance, a public cloud computing environment. Such hostility may be intentional. As an example, some tenants may literally be trying to infiltrate the operation or data of other tenants. Such hostility might also be unintentional. For instance, one tenant may inadvertently download malware onto shared resources of the various tenants. Accordingly, in public cloud computing environments, service provides operate the virtual machines on behalf of the tenants. Furthermore, trust boundary are provided such that the processes and data of the virtual machine are protected from the actions of processes outside of the virtual machine. Much like physical machines, virtual machines need to be started up through a boot process that can often take a significant time.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

At least one embodiment described herein relates to the low latency use of a multi-tenancy environment. In the multi-tenancy environment, multiple tenants share a common set of physical resources. However, to protect against hostility between tenants within different trust domains, one or more tenants of a common trust domain are run within a trust boundary component. An example of a trust boundary component is a sandbox environment such as a virtual machine. Thus, there is security to protect against potential hostility between tenants of different trust domains.

In order to quickly start up trust boundary components, there is a pool of multiple pre-readied (e.g., initialized, pre-booted, and/or snapshotted) trust boundary components that may be started up quickly when a new trust boundary is to be established. Processes within the trust boundary component may additionally be run within a resource container that facilitates allocation of resources amongst the various processes. Because trust boundary components may be started up quickly, the multi-tenancy environment may have security (as provided by the trust boundary components) while still being lower latency (due to the fast availability and startup of pre-readied trust boundaries). Thus, complex processes involving many parallel processes (perhaps even extending across multiple physical machines) may be performed with low latency. This allows complex map-reduce jobs to be performed even in environments in which there is potential hostile multi-tenancy, such as in a public cloud computing environment.

A single trust boundary component may run multiple resource containers. The running of a flexible number of resource containers within a trust boundary component also allows for more processes to be run on a single computing system, thereby more efficiently using physical resources.

In one embodiment, the trust boundary components each include a container management agent that starts and ends resource containers within the trust boundary component at the appropriate time, and provides sufficient affinity between process(es) associated with the resource containers and the underlying virtual and/or physical resources (such as processing cores, memory, storage, input/output bandwidth, and so forth). The container management agent may likewise provide the affinity in such a way that resource contention is eliminated or at least reduced to a level that continues to be acceptable to the customer. The system may provide an application program interface that is independent of the underlying container technology. Thus, different containers may be used without modifying the overlying infrastructure.

This intelligent resource allocation at the trust boundary component allows each trust boundary component to be allocated with a large number of resources that potentially overlap with the resources allocated to other trust boundary components. A container management service for the entire machine coordinates such that this overlapping allocation of resources to each trust boundary component does not result in resource contention and/or results in accepted levels of resource sharing. The container management service may provide an application program interface that is independent of the underlying trust boundary component technology. Thus, different trust boundary components may be used without modifying the overlying infrastructure.

This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which.

DETAILED DESCRIPTION

At least one embodiment described herein relates to the low latency use of a multi-tenancy environment. In the multi-tenancy environment, multiple tenants share a common set of physical resources. However, to protect against hostility between tenants within different trust domains, one or more tenants of a common trust domain are run within a trust boundary component. An example of a trust boundary component is a sandbox environment such as a virtual machine. Thus, there is security to protect against potential hostility between tenants of different trust domains.

In order to quickly start up trust boundary components, there is a pool of multiple pre-readied (e.g., initialized, pre-booted, and/or snapshotted) trust boundary components that may be started up quickly when a new trust boundary is to be established. Processes within the trust boundary component may additionally be run within a resource container that facilitates allocation of resources amongst the various processes. Because trust boundary components may be started up quickly, the multi-tenancy environment may have security (as provided by the trust boundary components) while still being lower latency (due to the fast availability and startup of pre-readied trust boundaries). Thus, complex processes involving many parallel processes (perhaps even extending across multiple physical machines) may be performed with low latency. This allows complex map-reduce jobs to be performed even in environments in which there is potential hostile multi-tenancy, such as in a public cloud computing environment.

A single trust boundary component may run multiple resource containers. The running of a flexible number of resource containers within a trust boundary component also allows for more processes to be run on a single computing system, thereby more efficiently using physical resources.

In one embodiment, the trust boundary components each include a container management agent that starts and ends resource containers within the trust boundary component at the appropriate time, and provides sufficient affinity between process(es) associated with the resource containers and the underlying virtual and/or physical resources (such as processing cores, memory, storage, input/output bandwidth, and so forth). The container management agent may likewise provide the affinity in such a way that resource contention is eliminated or at least reduced to a level that continues to be acceptable to the customer. The system may provide an application program interface that is independent of the underlying container technology. Thus, different containers may be used without modifying the overlying infrastructure.

This intelligent resource allocation at the trust boundary component allows each trust boundary component to be allocated with a large number of resources that potentially overlap with the resources allocated to other trust boundary components. A container management service for the entire machine coordinates such that this overlapping allocation of resources to each trust boundary component does not result in resource contention and/or results in accepted levels of resource sharing. The container management service may provide an application program interface that is independent of the underlying trust boundary component technology. Thus, different trust boundary components may be used without modifying the overlying infrastructure.

Some introductory discussion of a computing system will be described with respect to FIG. 1. Then, a low latency multi-tenancy environment will be described with respect to FIGS. 2 through 7.

Computing systems are now increasingly taking a wide variety of forms. Computing systems may, for example, be handheld devices, appliances, laptop computers, desktop computers, mainframes, distributed computing systems, datacenters, or even devices that have not conventionally been considered a computing system, such as wearables (e.g., eye glasses and watches). In this description and in the claims, the term "computing system" is defined broadly as including any device or system (or combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

Figure 1:
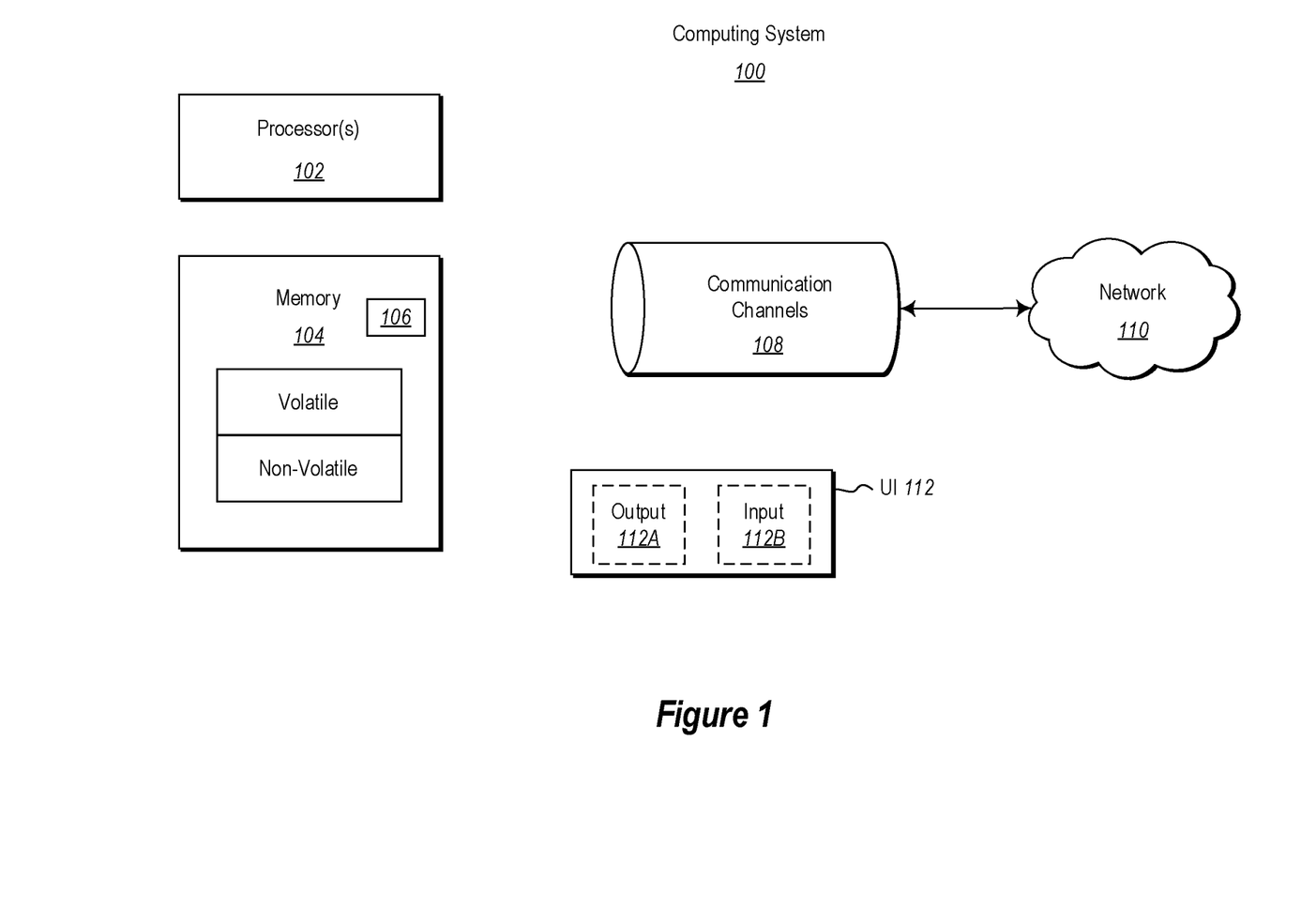
FIG. 1 illustrates an example computing system in which the principles described herein may be employed.

As illustrated in FIG. 1, in its most basic configuration, a computing system 100 typically includes at least one hardware processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

The computing system 100 also has thereon multiple structures often referred to as an "executable component". For instance, the memory 104 of the computing system 100 is illustrated as including executable component 106. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods that may be executed on the computing system, whether such an executable component exists in the heap of a computing system, or whether the executable component exists on computer-readable storage media.

In such a case, one of ordinary skill in the art will recognize that the structure of the executable component exists on a computer-readable medium such that, when interpreted by one or more processors of a computing system (e.g., by a processor thread), the computing system is caused to perform a function. Such structure may be computer-readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures that are implemented exclusively or near-exclusively in hardware, such as within a field programmable gate array (FPGA), an application specific integrated circuit (ASIC), or any other specialized circuit. Accordingly, the term "executable component" is a term for a structure that is well understood by those of ordinary skill in the art of computing, whether implemented in software, hardware, or a combination. In this description, the terms "component", "service", "engine", "module", "monitor", "scheduler", "manager", "module", "compiler", "virtual machine", "container", "environment" or the like may also be used. As used in this description and in the case, these terms (whether expressed with or without a modifying clause) are also intended to be synonymous with the term "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied on one or more computer-readable media that form a computer program product. An example of such an operation involves the manipulation of data.

The computer-executable instructions (and the manipulated data) may be stored in the memory 104 of the computing system 100. Computing system 100 may also contain communication channels 108 that allow the computing system 100 to communicate with other computing systems over, for example, network 110.

While not all computing systems require a user interface, in some embodiments, the computing system 100 includes a user interface 112 for use in interfacing with a user. The user interface 112 may include output mechanisms 112A as well as input mechanisms 112B. The principles described herein are not limited to the precise output mechanisms 112A or input mechanisms 112B as such will depend on the nature of the device. However, output mechanisms 112A might include, for instance, speakers, displays, projectors, tactile output, valves, actuators, holograms, virtual reality elements, augmented reality elements, and so forth. Examples of input mechanisms 112B might include, for instance, microphones, touchscreens, holograms, virtual reality elements, augmented reality elements, cameras, keyboards, accelerometers, levers, pedals, buttons, knobs, mouse of other pointer input, sensors of any type, and so forth.

Embodiments described herein may comprise or utilize a special purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM or other optical disk storage, magnetic disk storage or other magnetic storage devices, or any other physical and tangible storage medium which can be used to store desired program code means in the form of computer-executable instructions or data structures and which can be accessed by a general purpose or special purpose computing system.

A "network" is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system properly views the connection as a transmission medium. Transmissions media can include a network and/or data links which can be used to carry desired program code means in the form of computer-executable instructions or data structures and which can be accessed by a general purpose or special purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NIC"), and then eventually transferred to computing system RAM and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general purpose computing system, special purpose computing system, or special purpose processing device to perform a certain function or group of functions. Alternatively, or in addition, the computer-executable instructions may configure the computing system to perform a certain function or group of functions. The computer executable instructions may be, for example, binaries or even instructions that undergo some translation (such as compilation)

before direct execution by the processors, such as intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses) and the like. The invention may also be practiced in distributed system environments where local and remote computing systems, which are linked (either by hardwired data links, wireless data links, or by a combination of hardwired and wireless data links) through a network, both perform tasks. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

For instance, cloud computing is currently employed in the marketplace so as to offer ubiquitous and convenient on-demand access to the shared pool of configurable computing resources. Furthermore, the shared pool of configurable computing resources can be rapidly provisioned via virtualization and released with low management effort or service provider interaction, and then scaled accordingly.

A cloud computing model can be composed of various characteristics such as on-demand self-service, broad network access, resource pooling, rapid elasticity, measured service, and so forth. A cloud computing model may also come in the form of various service models such as, for example, Software as a Service ("SaaS"), Platform as a Service ("PaaS"), and Infrastructure as a Service ("IaaS"). The cloud computing model may also be deployed using different deployment models such as private cloud, community cloud, public cloud, hybrid cloud, and so forth. In this description and in the claims, a "cloud computing environment" is an environment in which cloud computing is employed.

Figure 2:
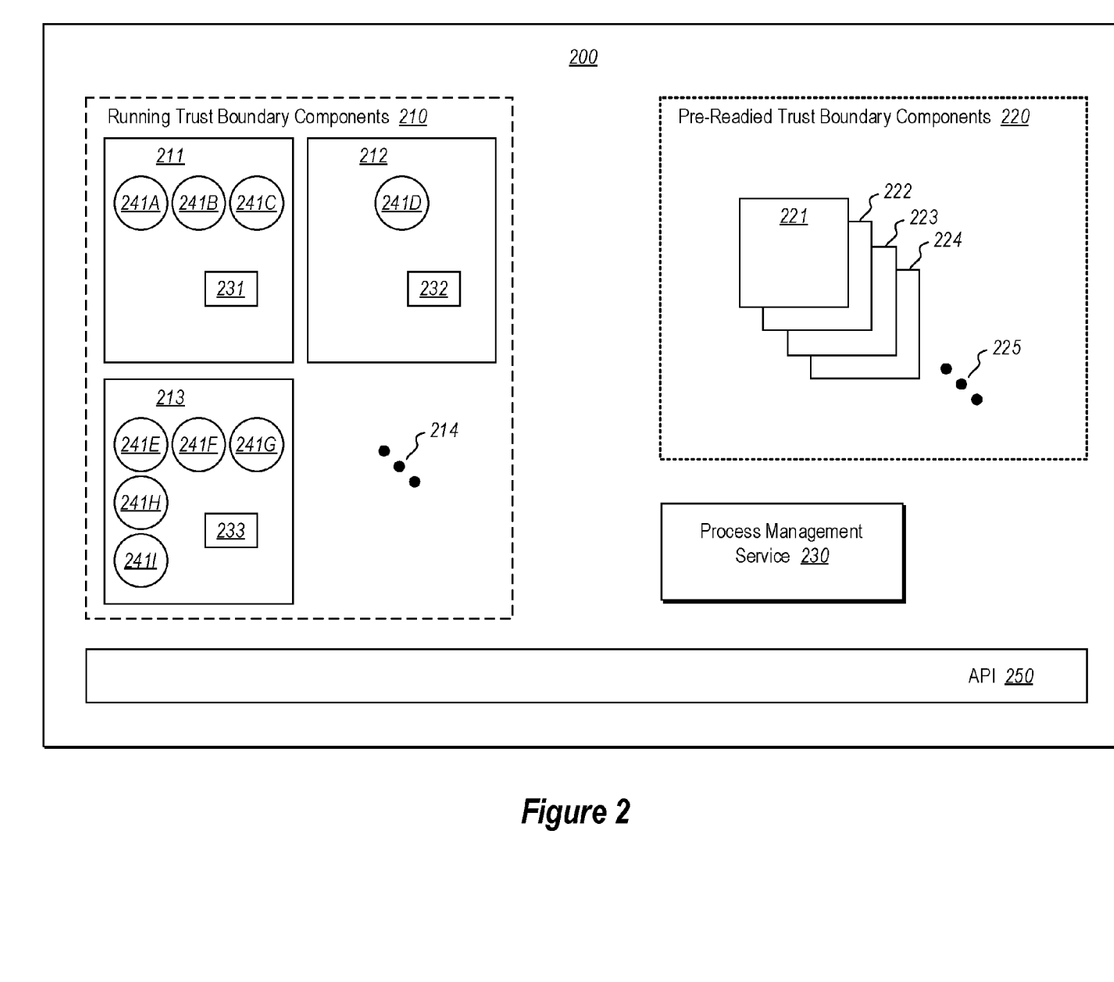
FIG. 2 illustrates a multi-tenancy environment in which the principles described herein may operate, in which a computing system runs multiple trust boundary components for each of various trust domains.

FIG. 2 illustrates a multi-tenancy environment 200 in which the principles described herein may operate. In this description and in the claims, a "multi-tenancy" environment 200 is an environment in which computing processes that share computing resources (such as processors, memory, storage, input/output channel bandwidth and so forth) may be run that belong to different customers (i.e.,  tenants). The multi-tenancy environment 200 may be, for instance, the computing system of FIG. 1. For instance, the multi-tenancy environment may be a host computing system (such as a processing node) within a cloud computing environment.

In such a multi-tenancy environment, there is often a possibility that processes running by different tenants may be hostile to one another. For instance, one process of one tenant may attempt to adversely affect the processing of another process of another tenant and/or steal data belonging to that other tenant. Even without malicious intent, a process of one tenant might download malware onto shared resources in a manner that other processes are affected.

In order to secure against the effects of this potential inter-process hostility, there may be multiple trust domains present within the multi-tenancy environment 200. For instance, each trust domain may be associated with processes running for a single tenant, or for any of multiple tenants that trust one another to secure themselves against the previously described hostility.

To provide a proper trust boundary between processes running within different trust domains, the multi-tenancy environments 200 runs multiple trust boundary components 210. The number of running trust boundary components 210 may vary over time as the number of trust domains vary. In the illustrated embodiment, the multi-tenancy environment 200 is illustrated as including three trust boundary components 211, 212 and 213. However, the ellipses 214 represent that this number may change over time, and that the principles described herein are independent of the number of trust boundary components running in the multi-tenancy environment. Examples of trust boundary component include environments that provide at least some sandboxing. A virtual machine is an example of a sandbox environment that provides protection against rogue processes and malware running outside of the virtual machine. Thus, as an example only, the trust boundary components 210 may each be virtual machines.

One or more processes associated with a common trust domain are run within trust boundary component 211. One or more processes associated with another common trust domain are run within the trust boundary component 212. Lastly, one or more processes associated with yet another common trust domain are run within the trust boundary component 213.

The computing system 200 also shows a pool of pre-readied trust boundary components 220 that are not operating, but are ready to be started quickly, notwithstanding their operation has not been called for yet, but is merely anticipated as potentially occurring. In FIG. 2, the pre-readied trust boundary components 220 are illustrated as including four pre-readied trust boundary component 221, 222, 223 and 224. However, the ellipses 225 represent that there may be any number of pre-readied trust boundary components within the pool 220. The number of pre-readied trust boundary components within the pool may further change over time. However, in some embodiments, there is at least one pre-readied trust boundary component within the pool 220.

Each of the pre-readied trust boundary components 220 are pre-readied to be quickly started. In this description and in the claims, a trust boundary component is "pre-readied" if it is either 1) already instantiated, 2) represented in storage in binary executable form (either packaged or already unpackaged), or 3) some combination of these two. An example trust boundary component may be a virtual machine. In any case, the pre-readied trust boundary components 220 are pre-readied for rapid starting.

Figure 3:
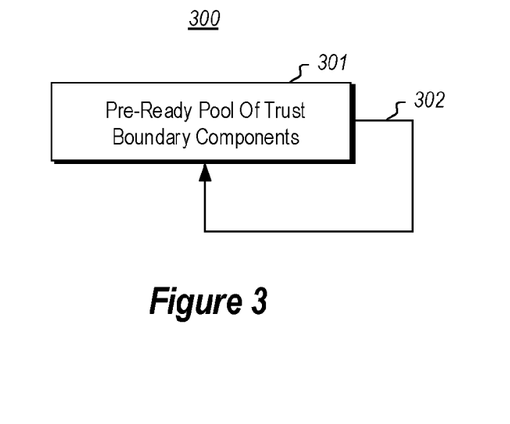
FIG. 3 illustrates a flowchart of a method for providing a multi-tenancy environment in which a multiples tenants share physical resources and new trust boundary components may be quickly started.

FIG. 3 illustrates a flowchart of a method 300 for providing a multi-tenancy environment in which a multiples tenants share physical resources and new trust boundary components may be quickly started. The method 300 involves pre-readying a pool of trust boundary components within the computing system (act 301). For instance, in the context of FIG. 2, the pool 220 of pre-readied trust boundary components is provided. In one embodiment, the pool 220 of pre-readied trust boundary components is maintained by a process management service 230 that is running in the computing system 200. The pool of pre-readied trust boundaries may be replenished (as represented by arrow 302) as pre-readied trust boundaries are used to quickly startup a running trust boundary component.

As an example, one or more of the trust boundary components 220 may be pre-initialized in a predetermined state. Such a predetermined state may be suitable for rapid beginning of processing. For instance, one or more of the trust boundary components may be in a state in which they would exist upon first starting up an instance of a trust boundary component from a trust boundary component class. In this example, a virtual machine may be in a state that it would be just after booting up a clean instance of a virtual machine. This post-booted state may be achieved by actually booting a virtual machine instance, but such is not required as a post-booted state may be achieved by any other mechanism described herein, such as reversion, recycling, pre-initialization, and so forth.

Alternatively, or in addition, one or more of the pre-readied trust boundary components may be snapshotted trust boundary components that had the predetermined state at the time of the snapshot. For instance, the trust boundary component might be pre-readied by having been previously snapshotted having a particular state suitable to begin processing quickly. Reversion may be used to quickly obtain and startup the snapshotted trust boundary component. In this description and in the claims, "reversion" of a trust boundary component means ignoring any changes in state, if any, that happened within the trust boundary component after the point of reversion, and resuming operation of the virtual machine as the state of the trust boundary component as the state existed at the time of the reversion.

For instance, if the trust boundary component is a virtual machine, some hypervisors have the capability to quickly revert to a prior snapshotted state of the virtual machine. In some embodiments, the snapshotted state of the virtual machine may be packaged in a hibernation file. As hibernation files are optimized for rapid startup, this packaging is suitable for the principles described herein in quickly beginning operation of a pre-readied trust boundary component.

Alternatively, or in addition, one or more of the pre-readied trust boundary components may be a recycled trust boundary component. Such a pre-readied trust boundary component may have been used previously (e.g., the virtual machine may be a recycled virtual machine) but signs of the prior use are swept clean in the recycling process as the recycled virtual machine assumes the predetermined clean state.

In one embodiment, the pre-readied trust boundary components 220 may be structured such that, when started, the trust boundary component have a flexible amount of resources that it may use. In that sense, the pre-readied trust boundary component may, once they start operating, be considered elastic in that the amount of resources allocated to the sandbox environment may be altered.

This pre-readying of the trust boundary components may allow the trust boundary component to be started up more quickly since the allocation step may be avoided. In some embodiments, the pre-readied trust boundary components may be initially pre-allocated with very little (or even no) resources. This further reduces the amount of time it takes to start up a pre-readied trust boundary component. It further allows many trust boundary components to be pre-readied and waiting at the ready to be available to accommodate new trust domains assigned to the computing system 200. Accordingly, while the pre-readied trust boundary components 220 are illustrated as including only four pre-readied trust boundary components 221, 222, 223 and 224, the ellipses 225 represent that there may be other numbers of trust boundary components (and potentially many more than illustrated) that stand at the ready to be started to accommodate new trust domains. Thus, the computing system 200 is flexible in quickly responding to the assignment of tasks related to new trust domains, and is also flexible in that dynamically changing amounts of resources may be assigned to each of the trust boundary component.

The process management service 230 may also allocate overlapping resources of one or more types to each of the of trust boundary components. An example of this is described in further detail with respect to FIG. 7. The process management service 230 further might affinitize virtual resources (such as virtual cores in the case of the resource type being processing capacity) to physical resources (such as physical cores in the case of the resource type being processing capacity). The process management service 230 may also ensure that resources running within each trust boundary component ensure that there is no overlapping amongst the trust boundary components of actually used resources of each of potentially multiple resource type by the trust boundary components. Alternatively, the processing management service 230 may also ensure that if there is such an overlapping, that each service level agreement for each tenant is further honored.

In order to manage proper sharing of resources within the multi-tenant environment, each process associated with a particular trust boundary component is run within a corresponding resource container. The resource container may be any container object that may have access to the application program interface of the corresponding operating system. For instance, in the MICROSOFT® WINDOWS® operating system, processes may be initiated with job objects. Also, in the LINUX® operating system, processes may be initiated with C-groups (or "control groups").

Each trust boundary component may include a corresponding process management agent that is responsible for establishing new resource containers within the trust boundary component. For instance, in FIG. 2, running trust boundary component 211 is illustrated as having process management agent 231; running trust boundary component 212 is illustrated as having process management agent 232; and running trust boundary component 213 is illustrated as having process management agent 233.

Each process management agent performs dynamic resource management that allocates (on a time-varying basis) resources allocated to the trust boundary component amongst resource containers operating within the trust boundary component such that resources for each of the plurality of resource containers do not overlap, or at least if there is an overlap, that all service level agreements are honored. As an example, in the case of processing, the process management agent may affinitize resource containers with the trust boundary component with virtual cores allocated to the trust boundary component. In the case of memory, the memory assigned to a trust boundary component may be dynamically altered. For instance, if the trust boundary component was a virtual machine of the WINDOWS Hypervisor, the dynamic memory feature of that hypervisor may be used to make such dynamic adjustments.

FIG. 2 illustrates that the multi-tenant environment 200 includes a programming interface (API) 250 for container manipulation. The API 250 might not depend at all on the underlying container technology, nor on the underlying trust boundary technology. Thus, the process management service 230, the process management agents 231, 232, 233, and the operating system of the computing system 200 may interface with the API 250 to manipulate the resource containers in same manner, even if the container and trust boundary technologies change over time. This allows the multi-tenant environment 200 to be agile in response to changing container and trust boundary technology. There may even be a hybrid of different types of resource containers within a single trust boundary component, and/or a hybrid of different types of trust boundary containers running on the computing system 200.

Figure 4:
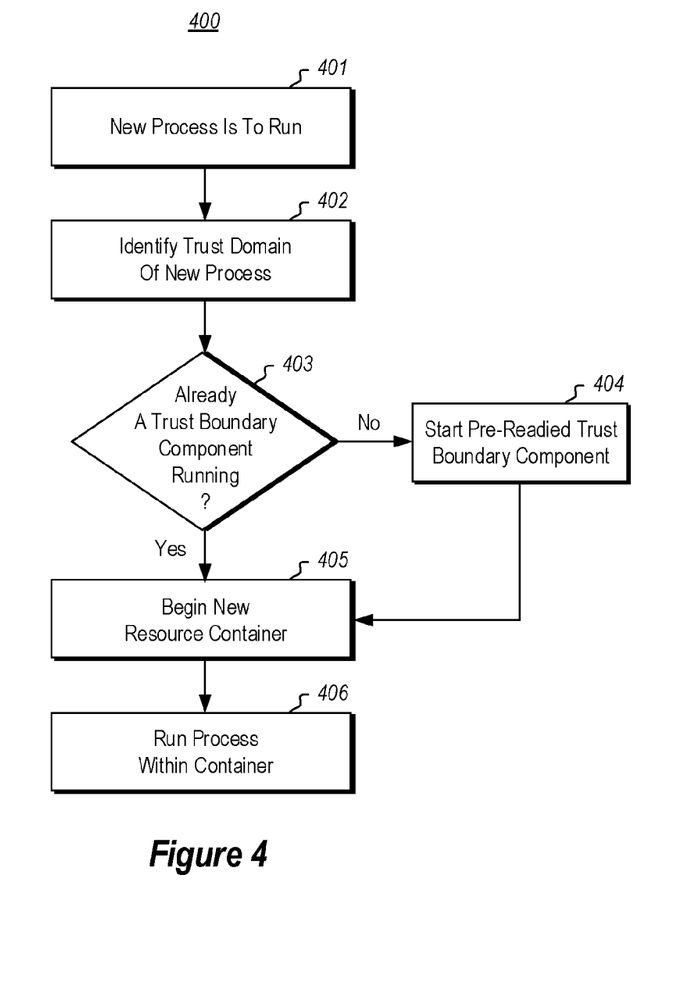
FIG. 4 illustrates a flowchart of a method for responding to the starting of new processes within the multi-tenancy environment.

FIG. 4 illustrates a flowchart of a method 400 for responding to the starting of new processes within the multi-tenancy environment. The method 400 may be performed in, for instance, the multi-tenancy environment 200 of FIG. 2. As an example, the method 200 may be performed by the process management service 230 of FIG. 2. The method 400 is initiated by determining that a new process is to run (act 401). Accordingly, the method 400 may be performed each time a new process is to run.

For each new process to be run within a trust boundary component, the trust domain of the new process is identified (act 402). If there is not already a trust boundary component already running for that trust domain ("No" in decision block 403), then one of the pre-readied trust boundary components is started up for running (act 404). For instance, in FIG. 2, the process management service 230 may know the correlation between trust domains and trust boundary components, and thus may make the determination of whether or not there are any existing trust boundary components corresponding to the trust domain of the new process. If there are no such trust boundary components, then the process management service may cause one of the pool 220 of pre-readied trust boundary components to be started up. Again, because of the pre-readying process, this startup may be a very fast process, perhaps in the order of single digits of seconds.

A new resource container for the process is then begun (act 405) within the identified trust boundary component. This may be accomplished via communication with the corresponding process management agent of the trust boundary component. The process is then run within resource container (act 406).

If the process management service determines that there is already a trust boundary component running for the trust domain of the new process ("Yes" in decision block 403), then a new resource container is run (act 405) within the trust boundary component associated with the trust domain of the new process. The new process is then run within that resource container (act 406). Thus, there may be multiple resource containers running in any given trust boundary component.

For instance, referring to FIG. 2, there are three resource containers 241A, 241B and 241C illustrated as running within the trust boundary component 211; one resource container 241D running within trust boundary component 212; and five resource containers 241E through 241I running within the trust boundary component 213. The running of multiple resources containers in a single trust boundary component allows the density of containers per unit hardware to be quite high, thereby efficiently using the hardware of the computing system 200. Thus, the principles described herein not only provide a fast, low-latency, and secure multi-tenancy environment, but also provides an environment that efficiently uses hardware resources.

Figure 5:
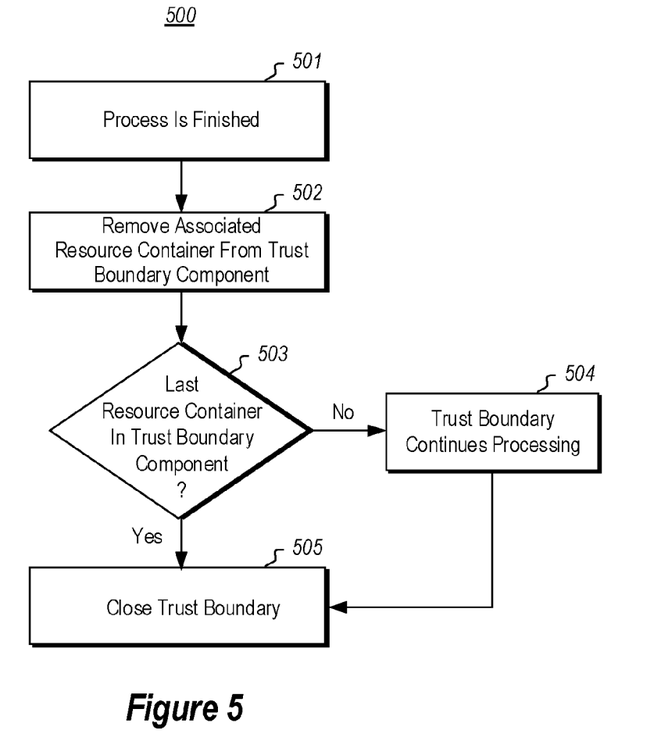
FIG. 5 illustrates a flowchart of a method for responding to the ending of a processes within the multi-tenancy environment.

FIG. 5 illustrates a flowchart of a method 500 for responding to the ending of a processes within the multi-tenancy environment. The method 500 may be performed each time it is determined that a process is finished (act 501). When a process is finished, the associated resource container is removed from the trust boundary component (act 502). If that removed resource container was not the last resource container within the trust boundary component ("No" in decision block 503) (i.e., the trust boundary component still has one or more other resource containers running therein), then the trust boundary component continues processing (act 504). On the other hand, if that removed resource container was the last resource container within the trust boundary component ("Yes" in decision block 503), the trust boundary container is closed (act 505). In some embodiments, there may be some passage of time before the process management service 230 decides to close the trust boundary component just in case a new process for the corresponding trust domain is about to begin.

Figure 6:
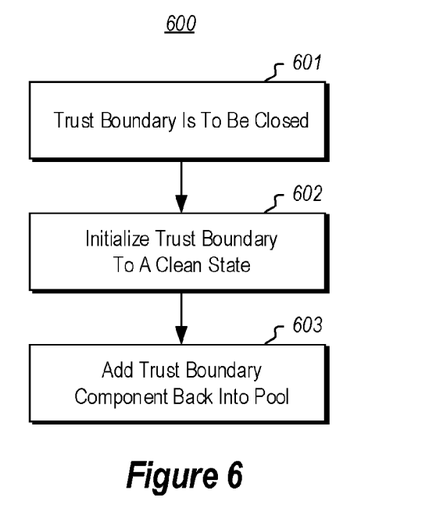
FIG. 6 illustrates a flowchart of a method for recycling a trust boundary component so as to be available with the pool of pre-readied trust boundary components.

In some embodiments, the closing of the trust boundary component (act 505) may include recycling the trust boundary component. FIG. 6 illustrates a flowchart of a method 606 for recycling the trust boundary component, which method 600 represents an embodiment of the act 505 of FIG. 5. Upon determining that the trust boundary is to be closed (act 601), the trust boundary component is initialized to a clean state (act 602), and added bad into the pool of pre-readied trust boundary components (act 603).

Figure 7:
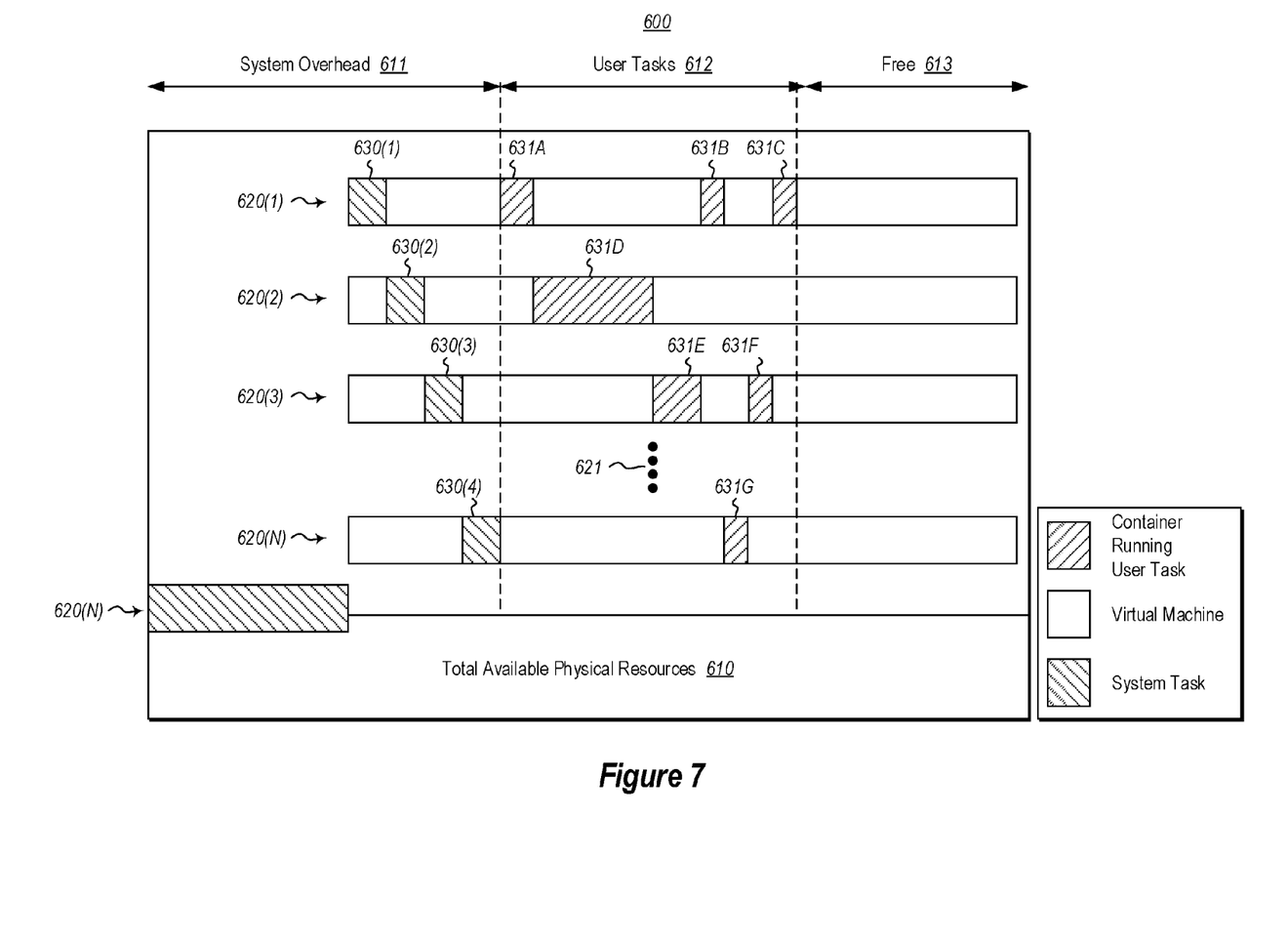
FIG. 7 illustrates a data structure that may be kept by the process management service in order to monitor resource usage, and avoid conflict between resource usage of the various operating trust boundary components and the system.

FIG. 7 illustrates a data structure 700 that may be kept by the process management service 230 in order to monitor resource usage, and avoid conflict between resource usage of the various operating trust boundary components and the system. The data structure 700 maps resource usage to the total available resources 710. The total resource usage includes system overhead 711, and user tasks 712. Any unused resources are designated as free resources 713.

The resources are mapped for each of the running trust boundary components. For instance, range 720(1) shows resource usage for one trust boundary component (e.g., trust boundary component 211), range 720(2) shows resource usage for a second trust boundary component (e.g., trust boundary component 211), and range 720(3) shows resource usage for a third trust boundary component (e.g., trust boundary component 213). The range 720(N) shows resource usage for an N'th sandbox environment (e.g., as represented by ellipses 214), where N is any positive integer. The ellipses 721 represent that there may be any number of ranges tracking usage for any number of sandbox environments. There is also a system range 722 that tracks system resource usage (e.g., for the operating system of the computing system and for system components such as the process management service 230).

System task resource usage is represented by the portions of ranges having right-leaning arrows (e.g., the entirely of range system range 722). Note that the operation of the trust boundary components themselves also take some system resources as represented by boxes 730(1), 730(2), 730(3) and 730(N). The amount of resources allocated for use by the trust boundary components and unused is represented by boxes having no fill. The amount of resources allocated for use by user tasks (e.g., processes running within resource containers and the resource containers themselves) is represented by the boxes having left-leading arrows (e.g., boxes 731A through 631F). Note that each of the trust boundary components trust boundary components may also be allocated the additional free space (represented by resources 713) since the performance isolation manager has a proper handle on preventing performance isolation.

Accordingly, a secure multi-tenancy environment has been described herein, in which new processes may be quickly started within new resource containers. This reduces latency in accomplishing a process. This latency benefit is especially seen when considering complex jobs that may now be performed in a public cloud environment, where processes may potentially be hostile towards each other. Now, the numerous trust boundaries needed to securely run complex jobs in a potentially hostile environment may be quickly started, thereby enabling complex jobs be performed in a public cloud environment with low latency. Thus, the technology described herein represents a significant advance in the state of multi-tenancy environment technologies.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computing system comprising:
   one or more processors;
   one or more computer-readable storage devices having stored thereon computer-executable instructions that are configured to be executed by the one or more processors to cause the computing system to configure the computing system to perform a method for providing a multi-tenancy environment in which a plurality of tenants share physical resources, the method comprising:
   before determining that a new process associated with a tenant is to be run in the multi-tenancy environment, pre-readying a plurality of trust boundary components within the computing system, each of the pre-readied trust boundary components being instantiated, initialized, and pre-booted but not yet operating and each of the pre-readied trust boundary components being enabled, after having been started, to host one or more resource containers and one or more processes in the multi-tenancy environment;
   determining that the new process associated with the tenant is to run in the multi-tenancy environment; and
   in response to determining that the new process is to be run:
      commencing running one of the plurality of pre-readied trust boundary components in the multi-tenancy environment; and
      hosting and running the new process associated with the tenant within the now running pre-readied trust boundary component.

2. The computing system in accordance with claim 1, the plurality of pre-readied trust boundary components comprising a plurality of pre-readied virtual machines.

3. The computing system in accordance with claim 1, the pre-readied plurality of trust boundary components comprising at least a plurality of initialized trust boundary components.

4. The computing system in accordance with claim 1, the pre-readied plurality of trust boundary components comprising at least a plurality of revertible trust boundary components.

5. The computing system in accordance with claim 4, at least one of the plurality of revertible trust boundary components comprises a hibernation file.

6. The computing system in accordance with claim 4, wherein changes to a state of a revertible trust boundary component since a reversion time being kept separate from other state of the revertible trust boundary component.

7. The computing system in accordance with claim 1, wherein running the new process associated with the tenant within the trust boundary component comprises:
   running the new processes associated with the tenant within a resource container within the trust boundary component.

8. The computing system in accordance with claim 1, the method further comprising:
   an act of running a plurality of resource containers within a trust boundary component.

9. The computing system in accordance with claim 8, wherein after a process is finished using a resource container of the plurality of resource containers, the resource container is removed from the trust boundary component.

10. The computing system in accordance with claim 9, wherein after a process is finished using a final resource container of the plurality of resources, the method further comprises:
    an act of revertibly initializing the trust boundary component; and
    an act of adding the initialized trust boundary component back into the plurality of pre-readied trust boundary components.

11. The computing system in accordance with claim 1, the multi-tenancy environment including an application program interface that is usable for communicating with different types of running and/or pre-readied trust boundary components.

12. The computing system in accordance with claim 1, the running trust boundary component including a container management agent that performs time-varying resource management that allocates resources allocated to the trust boundary component to the running trust boundary component itself and amongst a plurality of resource containers operating within the trust boundary component such that a service level agreement is honored.

13. The computing system in accordance with claim 12, the container management agent affinitizing containers with the trust boundary component to virtual cores allocated to the trust boundary component.

14. The computing system in accordance with claim 12, the running trust boundary component including a container management agent that performs time varying resource management that allocates resources allocated to the trust boundary component amongst a plurality of resource containers operating within the trust boundary component such that resources for each of the plurality of resource containers do not overlap.

15. The computing system in accordance with claim 1, the computing system further comprising a container management service that allocates overlapping resources of a particular type to each of the plurality of trust boundary components.

16. The computing system in accordance with claim 15, the container management service affinitizing virtual cores to physical cores.

17. The computing system in accordance with claim 15, the container management service performing time-varying resource management to ensure that a service level agreement is honored.

18. The computing system in accordance with claim 15, the container management service performing time-varying resource management to ensure that there is no overlapping of actually used resources of a particular type amongst the plurality of trust boundary components.

19. A method for providing a multi-tenancy environment in which a plurality of tenants share physical resources, the method comprising:

before determining that a new process associated with a tenant is to be run in the multi-tenancy environment, pre-readying a plurality of trust boundary components within the computing system, each of the pre-readied trust boundary components being instantiated, initialized, and pre-booted but not yet operating and each of the pre-readied trust boundary components being enabled, after having been started, to host one or more resource containers and one or more processes in the multi-tenancy environment;

determining that the new process associated with the tenant is to run in the multi-tenancy environment; and in response to determining that the new process is to be run:

commencing running one of the plurality of pre-readied trust boundary components in the multi-tenancy environment; and hosting and running the new process associated with the tenant within the now running pre-readied trust boundary component.

20. A computer program product comprising one or more computer-readable storage devices having thereon computer-executable instructions that are structured such that, when executed by one or more processors, cause the computing system to perform a method for providing a multi-tenancy environment in which a plurality of tenants share physical resources, the method comprising:

before determining that a new process associated with a tenant is to be run in the multi-tenancy environment, pre-readying a plurality of trust boundary components within the computing system, each of the pre-readied trust boundary components being instantiated, initialized, and pre-booted but not yet operating and each of the pre-readied trust boundary components being enabled, after having been started, to host one or more resource containers and one or more processes in the multi-tenancy environment;

determining that the new process associated with the tenant is to run in the multi-tenancy environment; and in response to determining that the new process is to be run:

commencing running one of the plurality of pre-readied trust boundary components in the multi-tenancy environment; and hosting and running the new process associated with the tenant within the now running one of the plurality of pre-readied trust boundary components.

* * * * *